United States Patent
Ujita

(10) Patent No.: US 8,203,079 B2
(45) Date of Patent: Jun. 19, 2012

(54) GROMMET

(75) Inventor: Satoshi Ujita, Yokkaichi (JP)

(73) Assignee: Sumitomo Wiring Systems, Limited, Mie (JP)

( * ) Notice: Subject to any disclaimer, the term of this patent is extended or adjusted under 35 U.S.C. 154(b) by 273 days.

(21) Appl. No.: 12/450,039

(22) PCT Filed: Oct. 11, 2007

(86) PCT No.: PCT/JP2007/069796
§ 371 (c)(1),
(2), (4) Date: Sep. 9, 2009

(87) PCT Pub. No.: WO2008/129703
PCT Pub. Date: Oct. 30, 2008

(65) Prior Publication Data
US 2010/0025077 A1 Feb. 4, 2010

(30) Foreign Application Priority Data
Apr. 13, 2007 (JP) .................................. 2007-106259

(51) Int. Cl.
*H01B 17/58* (2006.01)
*H02G 3/22* (2006.01)
(52) U.S. Cl. ................ 174/153 G; 174/650; 174/152 G; 16/2.1; 16/2.2; 248/56
(58) Field of Classification Search .................. 174/650, 174/153 G, 152 G, 135, 17 CT, 151, 142, 174/72 R, 88 R, 152 R, 654, 658; 16/2.1, 16/2.2; 439/604, 587, 274, 275; 248/56
See application file for complete search history.

(56) References Cited

U.S. PATENT DOCUMENTS

| | | | |
|---|---|---|---|
| 5,448,017 A * | 9/1995 | Nakajima et al. | 174/152 G |
| 6,088,874 A * | 7/2000 | Nakata et al. | 174/153 G |
| 6,101,674 A * | 8/2000 | Furuya et al. | 174/153 G |
| 6,267,385 B1 * | 7/2001 | Okamoto et al. | 16/2.1 |
| 6,600,105 B2 * | 7/2003 | Nakata et al. | 174/153 G |
| 6,685,195 B2 * | 2/2004 | Uchida et al. | 174/153 G |
| 7,098,402 B2 * | 8/2006 | Suzuki | 174/153 G |
| 7,423,223 B2 * | 9/2008 | Taira | 174/153 G |
| 7,683,265 B2 * | 3/2010 | Uchida et al. | 174/153 G |
| 7,834,272 B2 * | 11/2010 | Bikhleyzer | 174/153 G |
| 2006/0086524 A1 | 4/2006 | Suzuki | |

FOREIGN PATENT DOCUMENTS

| | | |
|---|---|---|
| JP | A-2006-123572 | 5/2006 |
| JP | A-2006-127787 | 5/2006 |

* cited by examiner

*Primary Examiner* — Angel R Estrada
(74) *Attorney, Agent, or Firm* — Oliff & Berridge, PLC

(57) ABSTRACT

A grommet that sheathes a wire harness for a motor vehicle comprising a smaller diameter tubular section provided at one end of the grommet and capable of being inserted into a through-hole in the motor vehicle, a tapered tubular section including a slant wall extending from the smaller diameter tubular section and the slant wall includes a pair of opposed longer sides, a pair of opposed shorter sides, and corner slant sides provided between the longer sides and the shorter sides, and a larger diameter tubular section extending through a vehicle body locking recess to a larger end part of the tapered tubular section and the larger diameter tubular section includes a pair of opposed longer sides, a pair of opposed shorter sides, and four round corners, the tapered tubular section is capable of deformation inward such that the vehicle body locking recess is engaged with the through-hole.

12 Claims, 6 Drawing Sheets

GROMMET

CROSS-REFERENCE TO RELATED APPLICATION

This Application is a National Phase Application of PCT Application PCT/JP2007/069796 filed on Oct. 11, 2007 and claims priority from Japanese Patent Application No. 2007-106259 filed on Apr. 13, 2007, the entire disclosures of which are incorporated herein by reference.

BACKGROUND

The present invention relates to a grommet that is attached to a wire harness to be arranged in a motor vehicle and is inserted into a through-hole in a vehicle body panel together with the wire harness to protect, waterproof, and dustproof the wire harness at a position inserted into the through-hole.

There exist grommets that are mounted on wire harnesses arranged between a vehicle body and a door of a motor vehicle and between an engine compartment and an indoor of the motor vehicle. Additionally, vehicle body locking recess that is provided in the grommet is fitted in a through-hole in a vehicle body panel.

In the case where the through-hole in the vehicle body panel is not a circular shape but a rectangular shape, as shown in FIG. 8A, it is necessary to design a vehicle body locking recess 1a of a grommet 1 to be a rectangular shape, and it is also necessary to design a tapered tubular section 1c continued to the vehicle body locking recess 1a to be a rectangular shape in cross section. In this case, four round corners 1d of the tapered tubular section 1c receive an outward force shown by an arrow in FIG. 8B on account of forces applied to longer sides 1e and shorter sides 1f. Consequently, it is difficult to elastically deform the corners 1d inward and then the corners 1d are dented as shown by a broken line in FIG. 8B. Thus, there is a problem that there is an increase in the contact resistance between the through-hole and the grommet.

A grommet 3 adapted to be fitted in a rectangular through-hole is shown in FIGS. 9A and 9B and disclosed in JP-A-2006-127787. The grommet 3 is provided on each of four corners 3d with a pawl 4. The pawl 4 will decrease the contact area between the corner 4 and the through-hole, and thereby decrease an inserting force.

However, as shown in FIG. 9B, the pawl 4 protrudes from a whole surface of each corner 3d. Thus, the pawl 4 will impede deformation of the corner 3d and increase a contact resistance.

SUMMARY

A grommet according to an exemplary aspect of the disclosure is adapted to be inserted into a rectangular through-hole in a vehicle body panel and to decrease an inserting force when the grommet is inserted into the through-hole.

In order to achieve the above object, a grommet that sheathes a wire harness for a motor vehicle comprising a smaller diameter tubular section provided at one end of the grommet and capable of being inserted into a through-hole in the motor vehicle, a tapered tubular section including a slant wall extending from the smaller diameter tubular section and the slant wall includes a pair of opposed longer sides, a pair of opposed shorter sides, and corner slant sides provided between the longer sides and the shorter sides, and a larger diameter tubular section extending through a vehicle body locking recess to a larger end part of the tapered tubular section and the larger diameter tubular section includes a pair of opposed longer sides, a pair of opposed shorter sides, and four round corners. The tapered tubular section is capable of being deformed inward in order for the vehicle body locking recess to be engaged with the through-hole. The vehicle body locking recess is formed into a configuration corresponding to the through-hole.

Preferably, the opposite ends of the corner slant sides of the slant wall are disposed on a first line extending through a shorter side one end of each round corner of the larger diameter tubular section in parallel to the longer side and on a second line extending through a longer side other end of each round corner of the larger diameter tubular section in parallel to the shorter side.

Preferably, a depth from a distal end of each slant side to a bottom of a groove in the vehicle body locking recess is deepest at the opposite ends of each slant side and becomes gradually shallower toward a central part of each slant side. Depths at the opposite ends of each slant side are the same as those of grooves in the vicinity of the longer side and shorter side.

BRIEF DESCRIPTION OF THE DRAWINGS

Exemplary embodiments will be described below with reference to the drawings, wherein.

DETAILED DESCRIPTION OF EMBODIMENTS

Figure 1:
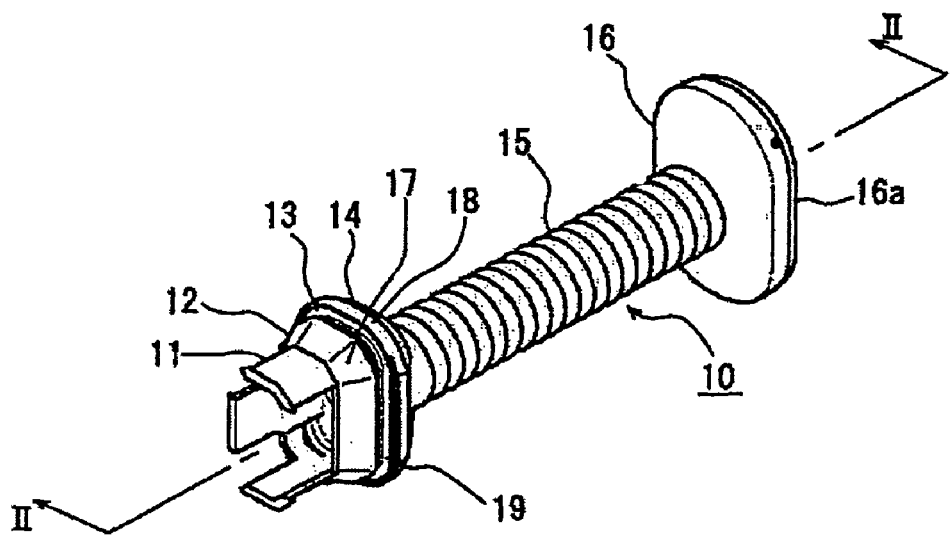
FIG. 1 is a perspective view of an embodiment of a grommet in accordance with the present invention.

An embodiment of a grommet in accordance with the present invention will be described below by referring to the drawings.

FIG. 1 to FIG. 7B show an embodiment of a grommet 10 in accordance with the present invention. The grommet 10 sheathes a wire harness W/H to be arranged between a vehicle body and a door of a motor vehicle. The grommet 10 is fitted in a through-hole H in a vehicle body panel P (FIG. 7A). The through-hole H is a rectangular shape having four round corners.

Figure 2:
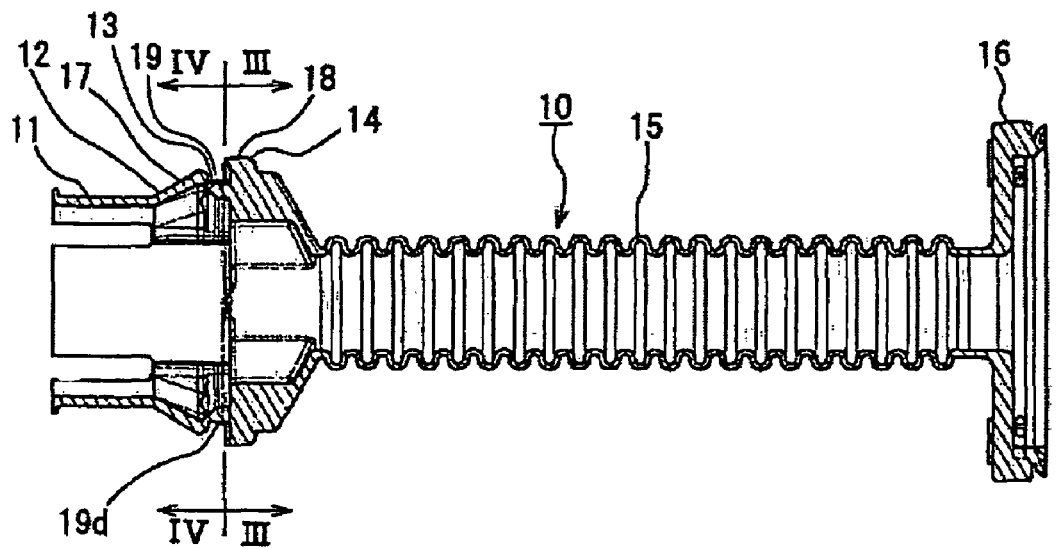
FIG. 2 is a longitudinal section view of the grommet taken along lines II-II in FIG. 1.

The grommet 10 is made of a rubber material and is integrally molded. As shown in FIGS. 1 and 2, the grommet 10 is provided on a front part in an inserting direction with a square frame-like smaller diameter tubular section 11 having slits for receiving a connector and on a rear part with a bellows-like tubular section 15 for threading the wire harness W/H. A tapered tubular section 12, a vehicle body locking recess 13, and a larger diameter tubular section 14 are continuously disposed between the smaller diameter tubular section 11 and the bellows-like tubular section 15. Furthermore, the grommet 10 is continuously provided on a rear end of the larger diameter tubular section 14 with the bellows-like tubular section 15 and on a rear end of the bellows-like tubular section 15 with a second larger diameter tubular section 16 having a vehicle body locking recess 16a adapted to be locked in an attaching hole in a door.

Figure 3A:
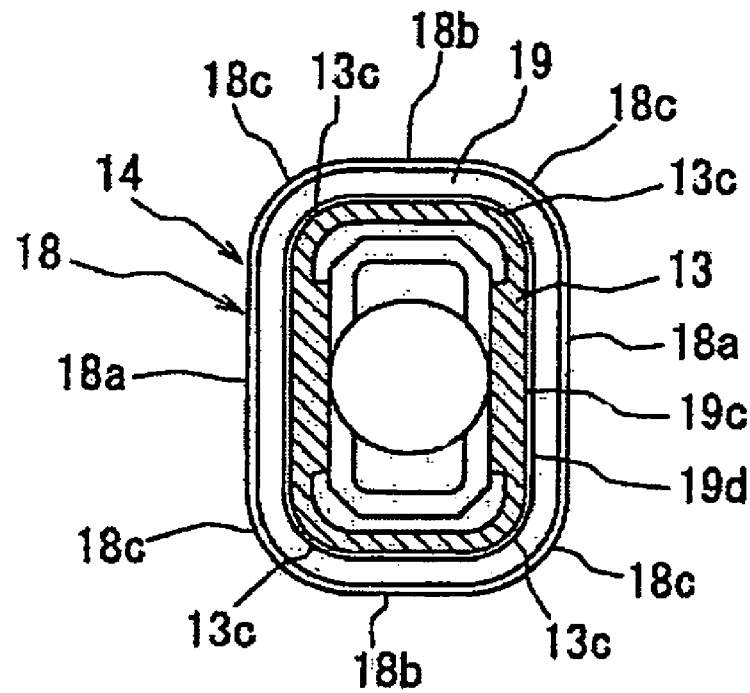
FIG. 3A is a cross section view of the grommet taken along lines III-III in FIG. 2.

As shown in FIG. 3A, the vehicle body locking recess 13 is formed into a rectangular annular configuration with four round corners 13c that correspond to a shape of the through-hole H.

Figure 3B:
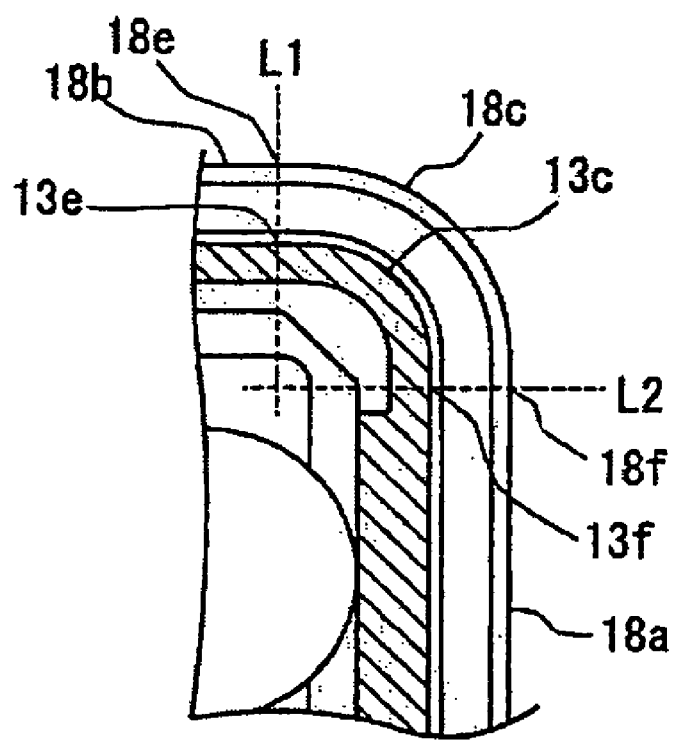
FIG. 3B is an enlarged cross section view of a main part of the grommet shown in FIG. 3.

A peripheral wall 18 of the larger diameter tubular section 14 is extended through the vehicle body locking recess 13 to the tapered tubular section 12. As shown in FIG. 3A, the peripheral wall 18 includes a pair of longer sides 18a, a pair of shorter sides 18b, and four round corners 18c between the longer and shorter sides 18a and 18b. As shown in FIG. 3B, opposite ends 18e and 18f of each round corner 18c are disposed on a line L1 extending through a shorter side one end 13e of each round corner 13c of the vehicle body locking recess 13 in parallel to the longer side 18a and on a line L2 extending through a longer side other end 13f of each round corner 13c in parallel to the shorter side 18b, respectively.

Figure 4A:
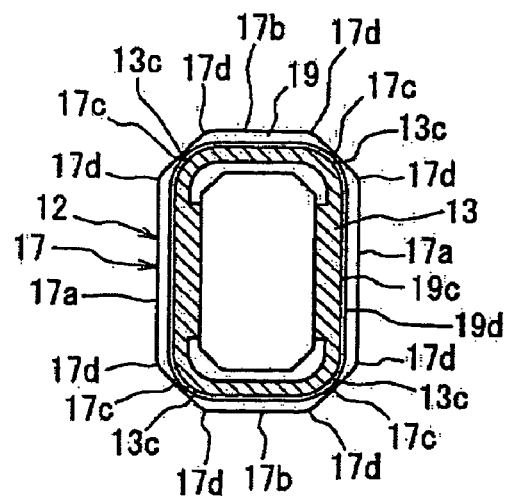
FIG. 4A is a cross section view of the grommet taken along lines IV-IV in FIG. 2.

The peripheral wall of the tapered tubular section 12 is inclined with respect to the vehicle body panel P in an enlarging direction to define a slant wall 17. As shown in FIG. 4A, the slant wall 17 is formed into an octagonal shape in cross section. That is, the slant wall 17 includes a pair of opposed longer sides 17a, a pair of opposed shorter sides 17b, and two pairs of opposed slant corner sides 17c between the longer sides 17a and the shorter sides 17b.

Figure 4B:
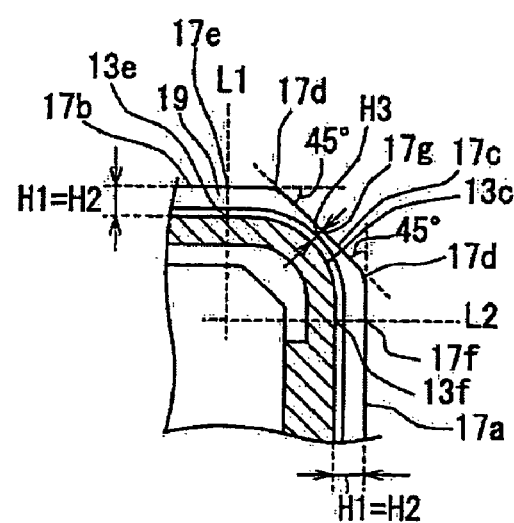
FIG. 4B is an enlarged cross section view of a main part of the grommet shown in FIG. 4A.

As shown in FIG. 4B, each slant corner side 17c is inclined by an angle of 45 degrees with respect to the longer side 17a and shorter side 17b and opposite end parts of each slant corner side 17c are rounded to define an arcuate end part 17d. The opposed longer sides 17a and opposed shorter sides 17b are smoothly continued through the arcuate end parts 17d to one another.

Figure 5:
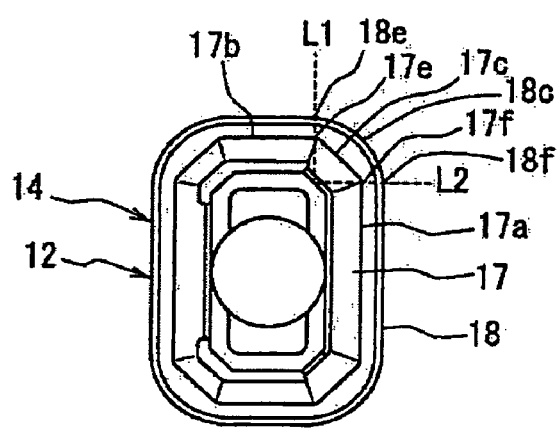
FIG. 5 is a side elevation view of the grommet taken from a vicinity of a smaller diameter tubular section.

As shown in FIG. 5, the opposite ends 17e and 17f of each slant corner side 17c are disposed on a line L1 extending through a shorter side one end 18e of each round corner 18c of the larger diameter tubular section 14 in parallel to the longer side 17a and on a line L2 extending through a longer side other end 18f of each round corner 18c in parallel to the shorter side 17b.

Figure 6A:
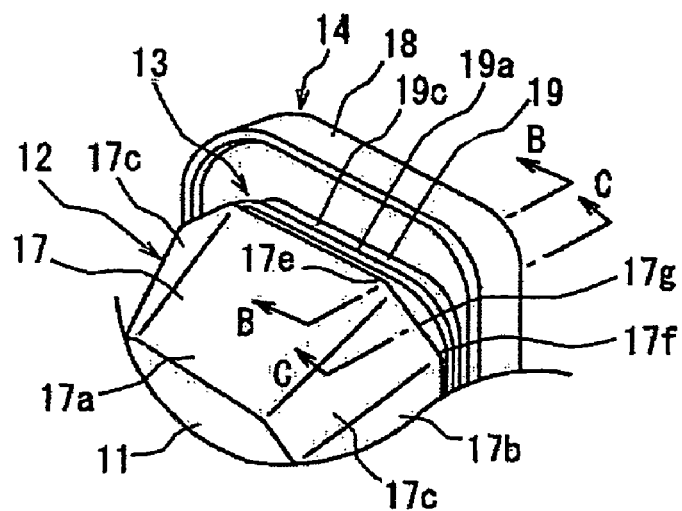
FIG. 6A is an enlarged perspective view of a main part of the grommet shown in FIG. 1.
Figure 6B:
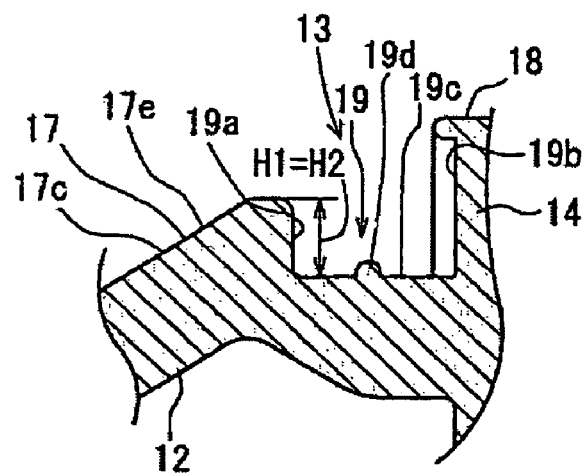
FIG. 6B is a section view taken along lines B-B in FIG. 6A.
Figure 6C:
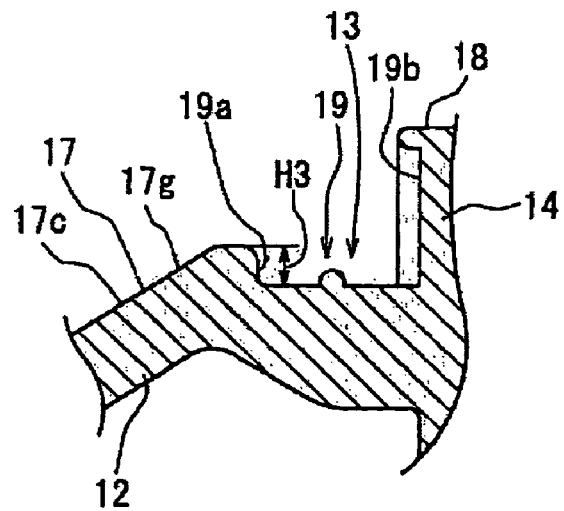
FIG. 6C is a section view taken along lines C-C in FIG. 6A.

As shown in FIGS. 6B and 6C, the vehicle body locking recess 13 includes a side wall 19a in the vicinity of the slant wall 17 of the tapered tubular section 12, a groove 19, a side wall 19b opposed in the vicinity of the larger diameter tubular section 14 through the groove 19 to the side wall 19a, and a seal lip 19d projecting from a bottom surface 19c of the groove 19.

As shown in FIG. 4B and FIGS. 6B and 6C, a depth of the groove 19 is set so that a depth H1 in the vicinity of the longer side 17a and shorter side 17b of the slant wall 17 is equal to a depth H2 at the opposite ends 17e and 17f of the slant side 17c. The depths H1 and H2 become gradually shallower from the opposite ends 17e and 17f of the slant side 17c to a central point 17g and the depths H1 and H2 become a minimum depth H3 at the central point 17g. In the present embodiment, the depth H1=the depth H2 are set to be 2.2 mm (millimeters) and the depth H3 is set to be 1 mm.

Figure 7A:
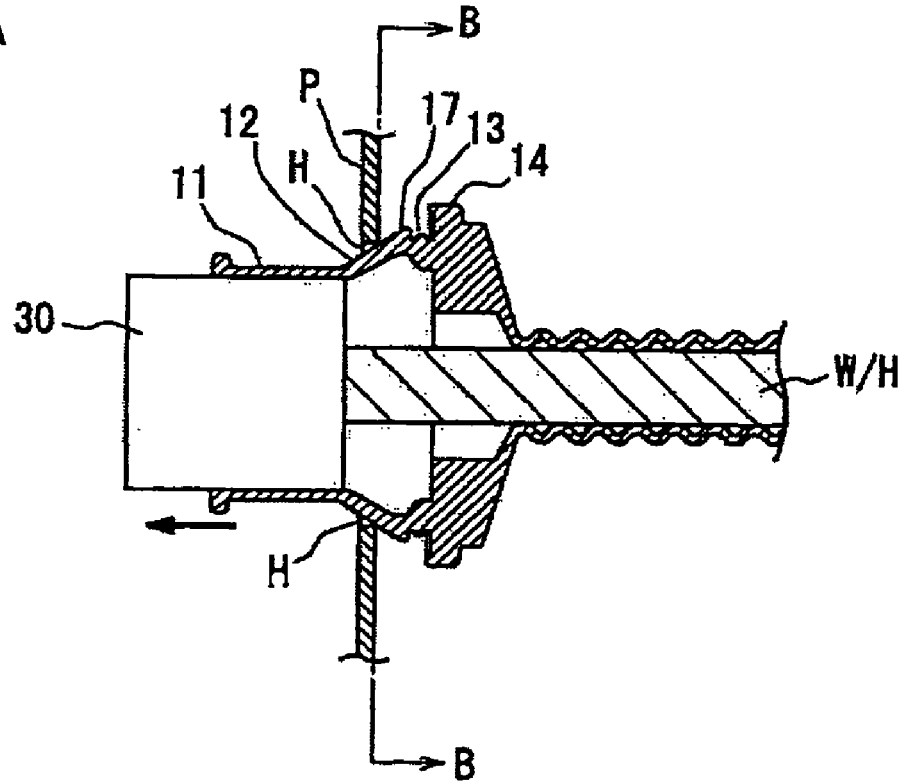
FIG. 7A is a longitudinal section view of the grommet shown in FIG. 1, illustrating a process for inserting the grommet into a through-hole in a vehicle body panel.
Figure 7B:
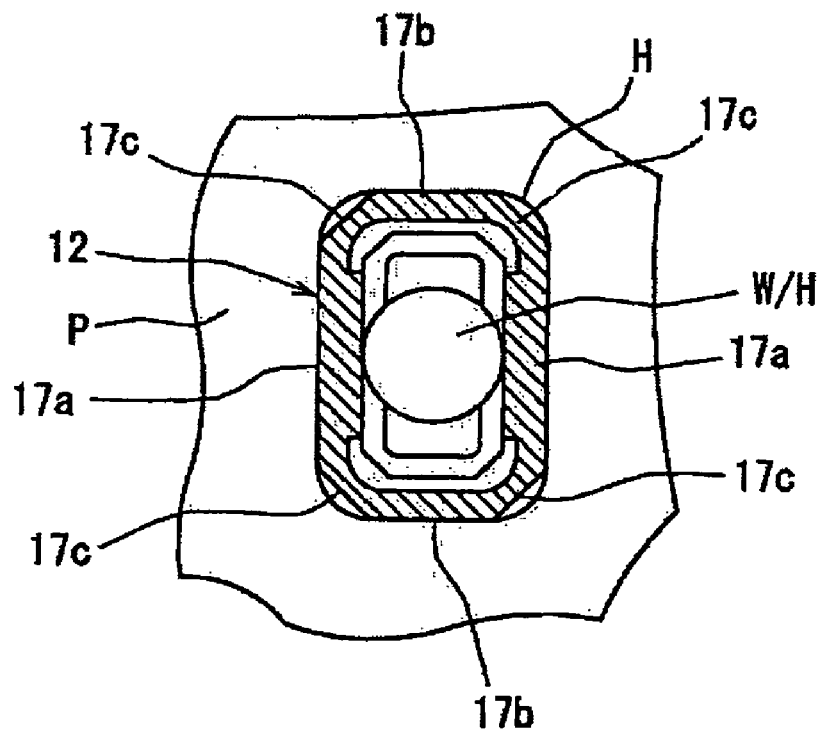
FIG. 7B is a cross section view of the grommet taken along lines B-B in FIG. 7A FIGS. 8A and 8B show a prior art grommet to be attached to a rectangular through-hole in a vehicle body panel.
Figure 8A:
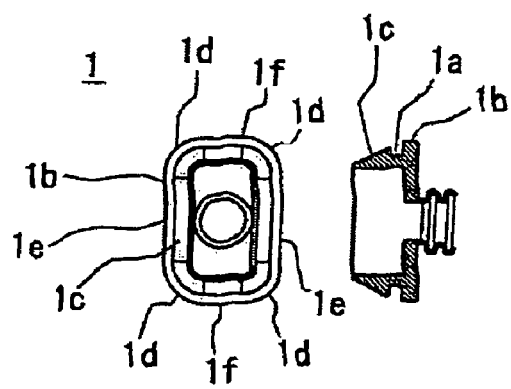
Figure 8B:
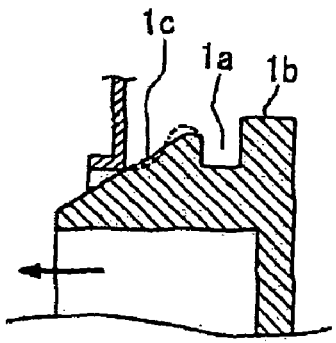
Figure 9A:
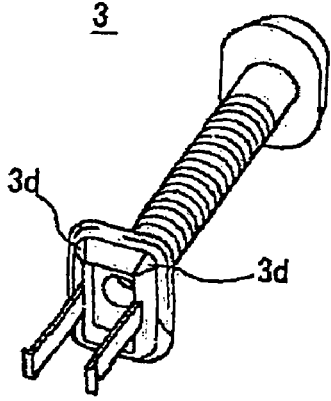
FIGS. 9A and 9B show another prior art grommet.
Figure 9B:
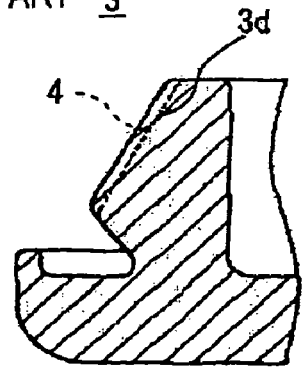

In order to insert the grommet 10 constructed above into the through-hole H, firstly a connector 30 connected to a distal end of the wire harness W/H is contained in the smaller diameter tubular section 11 and fixed in the smaller diameter tubular section II by winding a tape around the smaller diameter tubular section 11. Secondly, the smaller diameter tubular section 11 of the grommet 10 under the above state is inserted into the through-hole H in the vehicle body panel P, as shown in FIG. 7A. At this time, the slant wall 17 of the tapered tubular section 12 contacts with an inner periphery around the through-hole H. However, since the through-hole H is rounded at the four corners and the slant wall 17 defines the slant sides 17c, as shown in FIG. 7B, the contact area between the slant sides 17c and the through-hole H is small. Consequently, it is possible to reduce a contact resistance between the slant wall 17 and the through-hole H at the four corners that are likely to be deformed inward by an outward force.

Also, the opposite ends 17e and 17f of each slant side 17c of the slant wall 17, the opposite ends 13e and 13f of each round corner 13c of the vehicle body locking recess 13, and the opposite ends 18e and 18f of each round corner 18c of the larger diameter tubular section 14 are disposed on the line L1 parallel to the longer side 17a (18a) and the line L2 parallel to the shorter side 17b (18b). Thus, since the slant side 17c is disposed on the whole length in a peripheral direction at the four corners that are likely to be deformed inward by an outward force, it is possible to effectively moderate a contact resistance at the four corners.

Furthermore, since the depth of the vehicle body locking recess 13 continued to the slant side 17c is set under the condition described above, an engaging margin of the slant wall 17 with the through-hole H becomes smaller than an engaging margin of the longer side 17a and shorter side 17b with the through-hole H. In particular, since an engaging margin of the central point 17g of each slant side 17c, on which an outward force is likely to concentrate, is minimum, it is possible to reduce a dented amount of each slant side 17c when the slant side 17c passes the through-hole H.

As described above, since a contact area between the through-hole and the four corner slant sides of the slant wall 17 is reduced and the contact resistance is moderated, it is possible to effectively reduce an inserting force.

On the other hand, since even the shallowest central point 17g of each slant side in the vehicle body locking recess 13 is set to be a depth of 1 mm, it is possible to closely contact the side wall 19a in the vicinity of the slant wall 17 with the whole periphery around the through-hole H when the grommet 10 is attached to the through-hole H, thereby enhancing a water-stopping effect.

The grommet 10, in which the vehicle body locking recess 13 is inserted into the through-hole H in the vehicle body panel P, inserts the vehicle body locking recess 16a of the larger diameter tubular section 16 in the vicinity of a rear end of the grommet 10 into an attaching hole in a door panel (not shown). Thus, the grommet 10 that sheathes the wire harness W/H arranged between the vehicle body and the door can be bridged between the vehicle body and the door.

Since the grommet constructed above receives an outward force on the slant wall of the tapered tubular section to be deformed upon insertion, the corners that are hard to be deformed inward are not formed into round shapes corresponding to the through-hole but formed into slant sides by cutting sharp edges of the corners. Consequently, a contact area between the slant sides and the inner periphery around the through-hole can be reduced, a frictional resistance can be reduced at the corners in which a friction force were great in the prior art, an amount of deformation of the slant wall can be decreased, and an inserting force can be reduced, in comparison with the prior art grommet that contacts with the whole inner periphery around the through-hole.

Since the slant sides are formed at the positions on the first and second lines, the whole surface at the positions corresponding to the four round corners of the through-hole can define the slant sides. Thus, it is possible to surely moderate the contact resistance between the corners of the slant wall and the through-hole.

Since the depth of the groove in the vicinity of each slant side is set to be the condition described above, an engaging margin of the slant side with the through-hole becomes smaller than engaging margins of the longer side and shorter side with the through-hole. Furthermore, since an engaging margin of the central point of each slant side, on which an outward force is likely to concentrate, becomes minimum, it is possible to reduce a dented amount of each slant side when the slant side passes through-hole, to moderate a contact resistance, and to further reduce an inserting force.

It is required for the corners of the slant wall to ensure a certain amount of an engaging margin with the inner periphery around the through-hole in view of a water-stopping function of the grommet. Taking into a consideration of a balance between maintenance of the water-stopping function and reduction of the inserting force, it is preferable that the engaging margin (groove depth) at the central point of each slant side is set to be 30% to 60% of the engaging margin of each of the longer sides and shorter sides. In particular, the best value is $1/2.2$ and preferably more than 1 mm.

As described above, according to the present invention, since the corners of the slant wall of the tapered tubular section is not formed into a shape corresponding to the four corners of the through-hole but is formed into the slant sides, it is possible to reduce the contact area between the corners and the inner periphery around the through-hole, and to reduce the inserting force by moderating the contact resistance.

Since the groove depth of the vehicle body locking recess in the vicinity of each slant side is shallower than that of the longer side and shorter side and the groove depth at the central point of the slant side, on which the outward force is likely to concentrate, is set to be minimum, it is possible to reduce a dented amount of the corners that are likely to cause a great contact resistance, thereby effectively moderating the contact resistance and further reducing the inserting force.

The grommet of the present invention is not limited to the above embodiment. In the case where the grommet is inserted into a single through-hole in the vehicle body panel, it is not necessary to provide the grommet with the bellows-like tubular section and the second diameter tubular section.

The invention claimed is:

1. A grommet that sheathes a wire harness for a motor vehicle, the grommet comprising:
    a small diameter tubular section provided at one end of the grommet and capable of being inserted into a through-hole in the motor vehicle;
    a tapered tubular section including a slant wall extending from the small diameter tubular section, the slant wall includes:
        a pair of opposed longer sides;
        a pair of opposed shorter sides; and
        corner slant sides provided between the pair of opposed longer sides and the pair of opposed shorter sides; and
    a large diameter tubular section extending through a vehicle body locking recess to a larger end part of the tapered tubular section, the larger diameter tubular section includes:
        a pair of opposed longer sides;
        a pair of opposed shorter sides; and
        cutout-corner slant sides between the pair of opposed longer sides and the pair of opposed shorter sides; and
        four round corners, wherein:
            the tapered tubular section is capable of being deformed inward in order for the vehicle body locking recess to be engaged with the through-hole;
            the vehicle body locking recess is formed into a configuration corresponding to the through-hole; and
            a whole surface of the slant wall of each cutout-corner slant side being set to correspond to each of the four round corners of the through-hole in a vehicle body panel, a depth from a distal end of each of the corner slant sides to a bottom of a groove in the vehicle body locking recess being set to: i) be the same as depths of a groove of each of the pair of opposed longer sides and the pair of opposed shorter sides of the slant wall at opposite ends of each of the corner slant sides, ii) being set to be deepest, and iii) being set to become gradually shallower toward a central part of the cutout-corner slant sides, an engaging margin of a central part of the slant wall with a periphery around the through-hole in the vehicle body panel being set to be 30% to 60% of an engaging margin of the pair of opposed longer sides and pair of opposed shorter sides with the through-hole.

2. The grommet according to claim 1, wherein opposite ends of the corner slant sides of the slant wall are disposed: i) on a first line extending, through a shorter side of one end of each of the four round corners of the larger diameter tubular section, in a direction that is parallel to the longer side, and ii) on a second line extending, through a longer side of another end of each of the four round corners of said larger diameter tubular section, in a direction that is parallel to the shorter side.

3. The grommet according to claim 1, wherein a depth from a distal end of each of the corner slant sides of the slant wall to a bottom of a groove in the vehicle body locking recess is deepest at opposite ends of the corner slant sides and becomes gradually shallower towards a central part of the corner slant sides.

4. The grommet according to claim 2, wherein a depth from a distal end of each of the corner slant sides of the slant wall to a bottom of a groove in the vehicle body locking recess is deepest at opposite ends of the corner slant sides and becomes gradually shallower toward a central part of the corner slant sides.

5. The grommet according to claim 3, wherein depths at the opposite ends of the corner slant sides are the same as those of grooves in the pair of opposed longer sides and the pair of opposed shorter sides of the slant wall.

6. The grommet according to claim 4, wherein depths at the opposite ends of the corner slant sides are the same as those of grooves in the pair of opposed longer sides and the pair of opposed shorter sides of the slant wall.

7. A grommet that sheathes a wire harness for a motor vehicle, the grommet comprising:
    a small diameter tubular section provided at one end of the grommet and capable of being inserted into a through-hole in the motor vehicle;
    a tapered tubular section including a slant wall extending from the smaller diameter tubular section, the slant wall includes:
        a pair of opposed longer sides;
        a pair of opposed shorter sides; and corner slant sides provided between the pair of opposed longer sides and the pair of opposed shorter sides;

a locking recess that includes:
   a pair of opposed longer sides;
   a pair of opposed shorter sides; and
   four round corners; and a large diameter tubular section extending through a vehicle body locking recess to a larger end part of the tapered tubular section, the large diameter tubular section includes:
   a pair of opposed longer sides;
   a pair of opposed shorter sides; and
   four round corners, wherein:
      the tapered tubular section is capable of being deformed inward in order for the vehicle body locking recess to be engaged with the through-hole; and
      the vehicle body locking recess is formed into a configuration corresponding to the through-hole; and
      a whole surface of the slant wall of each cutout-corner slant side being set to correspond to each of the four round corners of the through-hole in a vehicle body panel, a depth from a distal end of each of the corner slant sides to a bottom of a groove in the vehicle body locking recess being set to: i) be the same as depths of a groove of each of the pair of opposed longer sides and the pair of opposed shorter sides of the slant wall at opposite ends of each of the corner slant sides, ii) being set to be deepest, and iii) being set to become gradually shallower toward a central part of the cutout-corner slant sides, an engaging margin of a central part of the slant wall with a periphery around the through-hole in the vehicle body panel being set to be 30% to 60% of an engaging margin of the pair of opposed longer sides and pair of opposed shorter sides with the through-hole.

8. The grommet according to claim 7, wherein:
   opposite ends of the corner slant sides of the slant wall are disposed on a first line extending through: i) a shorter side of one end of each of the four round corners of the larger diameter tubular section, and ii) a shorter side of one end of each of the four round corners of the locking recess, in a direction that is parallel to either: a) the longer side of the larger diameter tubular section, or b) the longer side of the locking recess; and
   opposite ends of the corner slant sides of the slant wall are disposed on a second line extending through: i) a longer side of another end of each of the four round corners of the larger diameter tubular section, and ii) a longer side of another end of each of the four round corners of the locking recess in a direction that is parallel to either: a) the shorter side of the larger diameter tubular section, or b) the shorter side of the locking recess.

9. The grommet according to claim 7, wherein a depth from a distal end of each of the corner slant sides of the slant wall to a bottom of a groove in the vehicle body locking recess is deepest at opposite ends of the corner slant sides and becomes gradually shallower towards a central part of the corner slant sides.

10. The grommet according to claim 8, wherein a depth from a distal end of each of the corner slant sides of the slant wall to a bottom of a groove in the vehicle body locking recess is deepest at opposite ends of the corner slant sides and becomes gradually shallower toward a central part of the corner slant sides.

11. The grommet according to claim 9, wherein depths at the opposite ends of the corner slant sides are the same as those of grooves in the pair of opposed longer sides and the pair of opposed shorter sides of the slant wall.

12. The grommet according to claim 10, wherein depths at the opposite ends of the corner slant sides are the same as those of grooves in the pair of opposed longer sides and the pair of opposed shorter sides of the slant wall.

* * * * *

UNITED STATES PATENT AND TRADEMARK OFFICE
CERTIFICATE OF CORRECTION

PATENT NO.        : 8,203,079 B2
APPLICATION NO.   : 12/450039
DATED             : June 19, 2012
INVENTOR(S)       : Satoshi Ujita It is certified that error appears in the above-identified patent and that said Letters Patent is hereby corrected as shown below:

Title Page

Please amend the assignee name as follows:

Item (73), please change "Sumitomo Wiring Systems, Limited" to --Sumitomo Wiring Systems, Ltd.--

Signed and Sealed this
Eleventh Day of September, 2012

David J. Kappos
*Director of the United States Patent and Trademark Office*